United States Patent [19]

Lancer, Jr. et al.

[11] 3,758,580

[45] Sept. 11, 1973

[54] SEPARATION OF TERTIARY CHELATING POLYAMINES

[75] Inventors: Arthur W. Lancer, Jr., Watchung; Thomas A. Whitney, Linden; Lawrence P. Klemann, Somerville, all of N.J.

[73] Assignee: Esso Research and Engineering Company, Linden, N.J.

[22] Filed: Nov. 26, 1971

[21] Appl. No.: 202,658

[52] U.S. Cl. ..... 260/563 R, 260/583 N, 260/583 P, 260/429 J, 260/439 F, 260/570.5, 260/576, 260/577, 260/582
[51] Int. Cl. ............................................ C07c 85/16
[58] Field of Search .................... 260/563 R, 583 R, 260/583 P, 583 N, 429 J

[56] References Cited
UNITED STATES PATENTS
3,038,904  6/1962  Godfrey.......................... 260/583 N FOREIGN PATENTS OR APPLICATIONS
463,364  1/1971  Japan.............................. 260/563 R

OTHER PUBLICATIONS

Ito et al. "Chem. Abstracts" Vol. 75 (1971) No. 48409r.

*Primary Examiner*—Lewis Gotts
*Assistant Examiner*—D. H. Phillips
*Attorney*—Leon Chasan et al.

[57] ABSTRACT

Tertiary chelating polyamines are separated and purified from their complex mixtures by selective complexation with metal salts wherein the metal is one selected from the group consisting of sodium, magnesium, iron, zinc, cadmium and mercury. The pure polyamines are thereafter recovered by destabilization of the complex. This invention is particularly useful for separating N-peralkylated commercial polyamine mixtures.

7 Claims, No Drawings

SEPARATION OF TERTIARY CHELATING POLYAMINES

This invention relates to the use of metal salts for separating mixtures of tertiary chelating polyamines by selective complexation with said metal salts.

In a copending patent application bearing Ser. No. 808,328 filed Mar. 18, 1969, in the name of Arthur W. Langer, Jr. and Thomas A. Whitney, it is taught that stable complexes can result from the interaction between a di-, tri-, or tetra- functional Lewis base, particularly a secondary or tertiary amine base, and an inorganic lithium salt. In another copending application bearing Ser. No. 872,955 filed Oct. 31, 1969, in the name of Arthur W. Langer, Jr. and Thomas A. Whitney, it is shown that tertiary polyamine bases can be separated from one another based upon their relative complexing affinities for the lithium cation. In particular, it is shown therein that a lithium salt, properly employed, can effect the separation of chelating polyamine bases from non-chelating systems, as well as effect the separation of one chelating polyamine from another chelating polyamine. Furthermore, geometric isomers or optical isomers of a polyamine base are separated with the appropriate lithium salt.

The subject invention describes a general method for the separation and purification of tertiary chelating bases from other substances having closely related physical and/or chemical properties via the selective formation of a chelate complex between a Lewis base and an appropriate inorganic metal salt. The above-identified cases do not anticipate the utility of any inorganic salts other than those of lithium for polyamines separations. In addition, no previous technology based on metal cation chelation describes the practical separation of single tertiary nitrogen poyamine compounds from complex mixtures of polyethylene polyamines which are presently commercially available.

The metal salts employed in the separation and purification of these mixtures of tertiary chelating polyamines are those salts having specific lattice energies which are critical in order for them to function in the complexation of the polyamines contained in the mixtures. The sodium salts are those inorganic sodium compounds having lattice energies less than about 180 kilocals per mole (the published lattice energy value for sodium bromide, which forms stable complexes with tertiary polyamines, is 176–178 kilocalories per mole). Therefore, the preferred group of metal compounds are those of sodium (with lattice energy of less than about 180 kcals/mole), and those of magnesium, iron, zinc, cadmium, mercury (with lattice energies less than or about equal to those possessed by the respective anhydrous chloride salts in each case). The lattice energy values are $ZnCl_2$ 629 Kcal/mole, $CdCl_2$ 587 Kcal/mole, $HgCl_2$ 629 Kcal/mole, $MgCl_2$ 604 Kcal/mole, KCl 154 Kcal/mole, $CaCl_2$ 546 Kcal/mole, $SrCl_2$ 494 Kcal/mole, $BaCl_2$ 444 Kcal/mole and $FeCl_3$ 642 Kcal/mole (calculated). Except for $FeCl_3$, the lattice energies are those reported in Gmelins Handbuch der Anorganischen Chemie. These inorganic salts can be present as hydrates or as complexes with displaceable Lewis bases; however, the substantially anhydrous salts are preferred and completely anhydrous salts are most preferred. Most preferred are salts of sodium and magnesium.

The term "inorganic" for the purpose of this invention means that there is no hydrocarbon radical bonded directly to the metal atom and any hydrocarbon radical present in the anion moiety must be indirectly bonded to the metal atom though a third atom other than carbon. Thus, sodium compounds such as n-butyl sodium and phenyl sodium do not meet the criteria and are outside the scope of this invention.

Subject to the limitations imposed by the lattice energy requirement set forth hereinabove, the anion moiety of the inorganic compound may otherwise be selected from the following list of specific but nonlimiting examples: azide, chloride, bromide, iodide, iodate, nitrate, nitrite, thiocyanate, $BF_4$, $PF_6$. Most preferred anions are the chloride, bromide, iodide and nitrate.

Included within the scope of this invention are the inorganic salts of the Group IA (excluding lithium) and Group IIA metals as well as those salts of metals which occur in Groups VIII, IB and IIB of the Periodic Table. Metal salts preferred in this invention are those of sodium, potassium beryllium, magnesium, calcium, strontium, iron, zinc, cadmium and mercury. Of still greater preference are the inorganic metal salts of sodium, magnesium, calcium, iron, strontium, zinc, cadmium and mercury. In addition, the most preferred salts are those of sodium, magnesium, iron, zinc, cadmium and mercury.

This invention which is based on the use of the above-mentioned inorganic salts of metals offers the advantage of improved selectivity thereby allowing many practical separations to be carried out for the first time using commercially available polyamine mixtures which have been N-peralkylated. The standard purification techniques (e.g. crystallization, fractional distillation, etc.) at best serve only to provide a mixture which is enriched in a particular component when these methods are applied to tertiary polyamine mixtures.

The chelating amine bases which can be separated by the process of this invention are the tertiary N-peralkylated polyalkylene polyamines having from two to six nitrogen atoms which are each separated by two or three carbon atoms. Preferably, the nitrogen atoms are each separated by two carbon atoms, i.e., N-peralkylated polyethylene polyamines. The carbon atoms bridging the nitrogen atoms can be substituted with hydrogen atoms or alkyl, aryl or aralkyl groups or combinations thereof, or the carbon atoms may be part of a ring containing between five and eight carbon atoms. While the amine bases may have a linear skeleton of carbon and nitrogen atoms they may also have one or more nitrogen atoms bearing two to three polyalkylene or polyamine groups thereby producing branched structures. If the carbon atoms bridging the nitrogen atoms carry alkyl, aryl or aralkyl substituents, said substituents contain from one to 10 carbon atoms.

The polyalkylene polyamine bases may furthermore have from one to six nitrogen atoms each separated by two or three carbon atoms in cyclic structures which may vary in size from a five- to a 24-membered ring. Preferably, these ring structures will contain between two and four nitrogen atoms and will vary in size from a six to a 12 membered ring. The heterocyclic structures may have one or more nitrogen atoms substituted with polyalkenyl polyamine groups which may themselves by cyclic, acyclic linear or acyclic branched.

Finally, the remaining substituents on the nitrogen atoms of the polyalkylene polyamines may be $C_1$–$C_4$ alkyl groups or $C_6$–$C_{10}$ aryl or aralkyl groups. Preferably these substituents are methyl, ethyl, phenyl, or benzyl, most preferably methyl groups.

Specific compounds which are found in typical N-permethylated polyamine mixtures are included (with their respective abbreviations) in the following list: cis- and trans-N,N,N',N'-tetramethyl-1,2-cyclohexanediamine (cis- and trans-TMCHD), N,N,N',N'-tetramethyl-1,3-cyclohexanediamine (TM-1,3-CHD), N,N,N',N'-tetramethylethylenediamine (TMED), 2,5,8-trimethyl-2,5,8-triazanonane (pentamethyldiethylenetriamine) (PMDT), N-methyl-N'-(2-dimethylaminoethyl) piperazine (cyclo-TriMTT), 2,5,-8,11-tetramethyl-2,5,8,11-tetrazadodecane (n-HMTT), tris(2-dimethylaminoethyl) amine (iso-HMTT), N,N'-bis (2-dimethylaminoethyl) piperazine (sym-cyclo-TMTT), N-methyl-N'-(3,6-dimethyl-3,6-diazaheptyl) piperazine (unsym-cyclo-TMTT), 2,8,11-trimethyl-5-(2-dimethylaminoethyl)-2,5,8,11-tetrazadodecane (iso-HMTP), 2,5,8,11,14-pentamethyl-2,5,8,11,14-pentazapentadecane (n-HMTP), N-methyl-N'-[6-methyl-3-)2-dimethylaminoethyl)-3,6-diazaheptyl] piperazine (iso-cyclo-PMPP), N-methyl-N'-(3,6,9-trimethyl-3,6,9-triazadecyl) piperazine (cyclo-PMPP₁), N-(2-dimethylaminoethyl)-N'-(3,6-dimethyl-3,6-diazaheptyl) piperazine (cyclo-PMPP₂), 2,5,11,14-tetramethyl-8-(2-dimethylaminoethyl)-2,5,8,11,14-pentazatetradecane (iso-OMPH₁), 2,8,11,14-tetramethyl-5-(2-dimethylaminoethyl)-2,5,8,11,14-pentazatetradecane (iso-OMPH₂), 2,11-dimethyl-5,8-bis(2-dimethylaminoethyl)-2,5,8,11-tetrazadodecane (iso-OMPH₃), and 2,5,8,11,14,17-hexamethyl-2,5,8,11,14,17-hexazaoctadecane (n-OMPH). The structures of these compounds are provided in the following table:

POLYAMINES PRESENT IN N-PERMETHYLATED, COMMERCIAL POLYAMINE MIXTURES

| Formula[1] | Abbreviation |
|---|---|
| | TMED |
| | PMDT |
| | iso-HMTT |
| | sym-cyclo-TMTT |
| | unsym-cyclo-TMTT |
| | n-HMTP |
| | iso-HMTP |
| | cyclo-PMPP₁ |
| | cyclo-PMPP₂ |
| | iso-cyclo-PMPP |
| | cyclo-TriMTT |
| | n-HMTT |
| | n-OMPH |
| | iso-OMPH₁ |
| | iso-OMPH₂ |
| | iso-OMPH₃ |

[1] ⌒ ≡ —CH₂CH₂—

The process by which this invention may be practiced involves three steps--complexation, isolation of the salt chelate and recovery of purified tertiary amines. The desired material may be separated from the multicomponent mixture by first adding it to a quantity of inorganic salt which will preferentially form a complex with the desired component. The desired component can be the major or minor constituent of the aforesaid mixture. The contacting of the multi-component mixture may be under homogeneous or hetero-geneous conditions and the quantity of the inorganic salt is determined by the particular complex to be formed. The amount of salt may be in excess of the stoichiometric quantity of the component to be complexed but preferably a stoichiometric amount or less of salt is employed. Generally 0.1 to 20 equivalents of metal salt to the tertiary amine to be complexed may be employed.

Preferably 0.8 to 1.2 equivalents of salt is used and most preferably 1.0 equivalent of salt is used.

After its formation, the complex, which is usually a solid, is separated from the multicomponent mixture by precipitation. The complex is then isolated by filtration. Alternatively, the inorganic compound may be contained in a reactor or bed through which a solution or mixture of amines is allowed to pass and the complexed amine is recovered from the bed by any appropriate destabilization method.

In practice, this invention permits the separation of isomeric and/or homologous polyamine compounds. Branched or linear acyclic tertiary polyamines may be separated from mixtures containing these together with cyclic-isomeric and both acyclic and cyclic homologous compounds. Cis- and trans-geometric isomers or positional isomers may also be separated from one another following the dictates of this invention.

The desired component is obtained in substantially pure form by destabilization of the complex. Destabilization is readily accomplished by addition of polar, protic solvents, (e.g., water, alcohol, ethylene, glycol, methanol, etc.), or aqueous or anhydrous acids or bases (e.g., hydrochloric acid, acetic acid, sodium hydroxide, ammonium hydroxide, potassium hydroxide) to the complex, or by heating the complex, usually under vacuum, at a temperature in the range of about 30° to 250°C or by extraction of the complex with a solvent which will dissolve the tertiary amine component but will not dissolve the inorganic salt of the complex, or by contacting the complex in solution with an agent (e.g., a diamine dioxide) which will form a more stable and/or less soluble complex with the inorganic salt, or by a combination of the above methods. Should the desired component remain in the effluent it may be easily separated therefrom by distillation, extraction or repetition of the instant separation process using the same metal salt with a change in process variables such as temperature or by using a different metal salt.

The purification and/or separation processes may of course be advantageously utilized with column and counterflow techniques; i.e., the inorganic metallic salts (complexed or uncomplexed) may be contacted with a countercurrent flow of a hydrocarbon solution of the polyamine mixture and the resultant complex may then be subjected to destabilization to recover the desired tertiary amine in a pure state.

It is desirable in utilizing this invention to predict the ease of formation of the various possible complexes in the mixture. This depends directly on the relative stability of the various complexes; i.e., the most stable complexes are formed preferentially, followed by the next most stable complexes, etc. Generally, if the chelating agent forms a five-membered ring including the metal atom, this complex will be more stable than the correspondingly formed six-membered ring, which in turn would be more stable than the correspondingly formed seven-membered ring (which is of approximately equivalent stability to the four-membered ring).

Other factors to be considered, and which will become especially important when ring size and entropy considerations as discussed above are essentially equivalent, are steric hindrance and the respective nitrogen-nitrogen distances of the tertiary amines to be separated.

Of course, stability also depends on the temperature of the reaction mixture. Complexes may be readily prepared at temperatures of about −50° to about 200°C, preferably 0° to 100°C. However, higher temperatures favor dissociation of the less stable complexes. Temperature then, may be adjusted to selectively complex the desired chelating agent.

If after the isolation of the more stable complex, the desired component has remained in the effluent, and the effluent still contains a mixture of polyamines which are not easily separated by conventional methods, then the complexation procedure is repeated as necessary. Since the most valuable chelating agents usually form the most stable complexes, this invention generally allows one to recover the most desirable component of a mixture in a single step.

It should be noted that complexation readily occurs by mixing the proper metal salt with the tertiary polyamine mixture in the absence of solvent; however, such mixing may also be accomplished in the presence of inert hydrocarbons, e.g., $C_4$–$C_{20}$ alkanes (e.g., pentane, heptane, hexadecane); $C_6$–$C_{20}$ aromatics (e.g., benzene, toluene, xylene, dibutylnaphthalene); halogenated aromatics (e.g., chlorobenzene, dichlorobenzene, hexafluorobenzene); heterocyclic compounds (e.g., pyridine, pyrrole, furan, thiophene, sulfolane, borazole); or mixtures thereof.

The amount of the diluent is not critical and amounts in the range of 0 to 99.9 wt.%, based on the complex, may be conveniently employed. Thus, the complex can be prepared in the absence of solvents, in the form of pastes and in solvents. Although substantially anhydrous solvents are preferred, small amounts of water may be present in the solvents or associated with the metal salts in some cases without having adverse effects on the operation of the process.

EXAMPLE 1

One milliliter (ca. 5 mmol) of impure TMCHD (86 percent trans- with the cis-isomer the major contaminant) was diluted with one-half milliliter of heptane and this solution was contacted for two days with 4.3 mmol of solid $MgCl_2 \cdot 6H_2O$. After dilution of the mixture with 1.8 ml of hexane the solids were isolated by filtration. G.C. analysis of the filtrate showed it to be 96.2 percent trans-TMCHD on a solvent-free basis.

This example shows that a minor component (in this case the cis-TMCHD isomer) of a complex mixture of diamines can be selectively complexed and isolated resulting in a net puri-fication of the major component.

EXAMPLE 2

Using the same procedure as Example 1, the impure TMCHD was contacted with 4.5 mmol of $FeCl_3 \cdot 6H_2O$. In this case the filtrate contained trans-TMCHD in greater than 98 percent purity.

This example shows that hydrated transition metal salts are specific complexing agents even when employed in greater than a 6.5 molar excess over the component which complexes preferentially. Thus excess inorganic salt is not detrimental when the lattice energy of the salt is in proper balance with relative stabilities of the various possible polyamine-salt complexes which could be formed in the mixture.

EXAMPLE 3

Using the same procedure as Example 1, the impure TMCHD was contacted with 4.5 mmol of NaBr. After separation of the solid and liquid phase the latter as analyzed and its composition was found to be unchanged from the original TMCHD solution.

It can be inferred from these results that the lattice energy of sodium bromide is sufficiently high so as to preclude the formation of a stable complex with any of the N-permethylated cyclohexane diamine isomers in the impure TMCHD. This example shows that at least one complex must be stable under the operating conditions for selective complexation to be successful.

EXAMPLE 4

A mixture of 1 ml (≈5 mmol) of impure TMCHD (refer to Table I for actual composition), 2.3 ml of hexane, and 4.5 mmol of $CdCl_2$ was shaken for two days. The solid present was isolated by fitration, was washed with pentane, and was then dissolved in 3.8 ml of 24 percent aqueous sodium hydroxide. This solution was extracted with hexane (1.8 ml) and this extract was analyzed by G.C. (refer to Table I for composition of the $CdCl_2$ complex).

TABLE I

G.C. ANALYSIS OF TMCHD MIXTURE

| Component | Starting Material (%) | Complex (%) |
|---|---|---|
| trans-TMCHD | 87.3 | 93.9 |
| A | 6.3 | 0.8 |
| B | 2.0 | 4.4 |
| C | 3.4 | 0.9 |
| D | 1.0 | |

This example shows that $CdCl_2$ can selectively complex the trans-TMCHD from a commercial mixture containing no less than five components which have similar physical and chemical properties.

EXAMPLE 5

Ten grams of a heptane solution containing ca. 13 mmol of impure TMCHD (composition given under "starting material" in Table II) was contacted with $CdCl_2$ (20 mmol) for 18 hours. The liquid and solid phases were then separated by filtration. The liquid phase was analyzed by G.C. (composition given under "filtrate" in Table II). The solid (5.0 g) was hydrolyzed with KOH, extracted with pentane, and the pentane extracts were concentrated and then analyzed by G.C. (composition given under "complex" in Table II).

TABLE II

G.C. ANALYSIS OF TMCHD

| | Compositions, % of Fractions | | |
|---|---|---|---|
| Component | Starting Material | Filtrate | Complex |
| cis-TMCHD | 39.6 | 73.4 | |
| A | 1.4 | 2.6 | |
| B* | 58.7 | 24.0 | <99 |

*Based on molecular weight, analytical, nmr, and chemical ionization mass spectral data, component "B" has been tentatively identified as N,N,N',N'-tetramethyl-1,3-cyclohexanediamine, TM-1,3-CHD.

This example shows that $CdCl_2$ will selectively complex component B (TM-1,3-CHD) from a mixture consisting mainly of cis-TMCHD and TM-1,3-CHD.

EXAMPLE 6

A mixture of 1.27 mole of impure iso-HMTT (containing 18 percent n-HMTT as the major contaminant), powdered NaI (0.868 mol), and benzene (3.5 liter) was stirred for 4 days whereupon the precipitated complex was isolated by filtration. The yield of dried solid was 334g.

A sample of this material (176g) was decomposed by a water-benzene mixture in a liquid-liquid, continuous extractor. After 40 hours the benzene layer was separated, dried over anhydrous $Na_2CO_3$, and distilled to give 62.2g of iso-HMTT (bp. 75°–77°C/0.075 mm Hg).

This represents a 75.5 percent recovery of iso-HMTT from the original mixture. This material was 99.6 percent pure as determined by G.C. analysis (0.4% n-HMTT remained).

By contrast, distillation of a portion of the same sample of the starting impure iso-HMTT through a 15-plate Oldershaw column at a 40:1 reflux ratio provided product having a maximum purity of 94 percent in a yield of only about 20 percent.

Thus, inorganic sodium salt chelates may be employed to separate and/or purify polytertiary amines having the same, or virtually the same, boiling points and molecular weights in a single stage operation.

EXAMPLE 7

One mole of impure n-HMTT (See Table III) in 1.5 liters of n-pentane was stirred with 23g of powdered NaI for 24 hours. An additional 23g of NaI was then added and stirring was continued for 48 hours. The solids were then removed by filtration and the composition of the filtrate was analyzed (see Table III). The n-HMTT was finally separated from the remaining impurities by fractional vacuum distillation (bp. ca 80°C/0.075 mm Hg on a 15 plate Oldershaw column, reflux ratio 20:1). The center cut from two of the above runs gave 218g of pure n-HMTT (> 99 percent pure).

TABLE III

| Components[a] | Crude | Relative Composition (%) after Chelation | After Chelation-Distillation |
|---|---|---|---|
| TMED, PMDT | 0.82 | 0.70 | |
| iso-HMTT | 9.23 | 0.59 | |
| n-HMTT | 80.90 | 88.38 | 99+ |
| unsym-cyclo-TMTT | 4.30 | 5.38 | |
| sym-cyclo-TMTT | 4.75 | 5.02 | |

[a]The structures are given below:

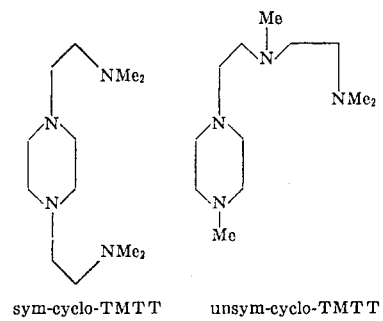

sym-cyclo-TMTT    unsym-cyclo-TMTT

This example shows that the high selectivity of sodium iodide allows the selective removal of the branched isomer (in this case also a minor isomeric component) from a tetramine mixture.

EXAMPLE 8

A mixture of crude HMTP (0.1 mol), powdered NaI (0.05 mol), and toluene was stirred for three days whereupon precipitation was completed by the addition of pentane (100 ml) and brief cooling (to ≈0°C). The complex was isolated by filtration and was decomposed as described in Example 6 to give 11.0g(38.4 percent recovery) of n-HMPT as a colorless liquid, bp 96°–116°C/0.01 mm. The purity of the product was determined to be 98.5 percent n-HMTP by VPC analysis. The only impurity was 1.5 percent iso-HMTP. The compositions of the crude HMTP and the purified n-HMTP are given in Table IV.

TABLE IV
HMTP MIXTURE

| Component[a] | Crude HMTP (%) | Purified n-HMTP from NaI Complex |
|---|---|---|
| n-HMTT | 2.1 | |
| unsym-TMTT | 1.9 | |
| sym-TMTT | 0.3 | |
| iso-HMTP | 13.9 | 1.5 |
| n-HMTP | 48.8 | 98.5 |
| iso-cyclo-PMPP | 0.8 | |
| cyclo-PMPP$_1$ | 5.5 | |
| cyclo-PMPP$_2$ | 11.4 | |
| OMPH isomer(s) | 8.2 | |
| OMPH isomer(s) | 7.1 | |

[a]Structures are given at end of Example.

This example illustrates the selective separation of the linear tertiary tetraethylene pentamine isomer from its branched and cyclic isomer analogs.

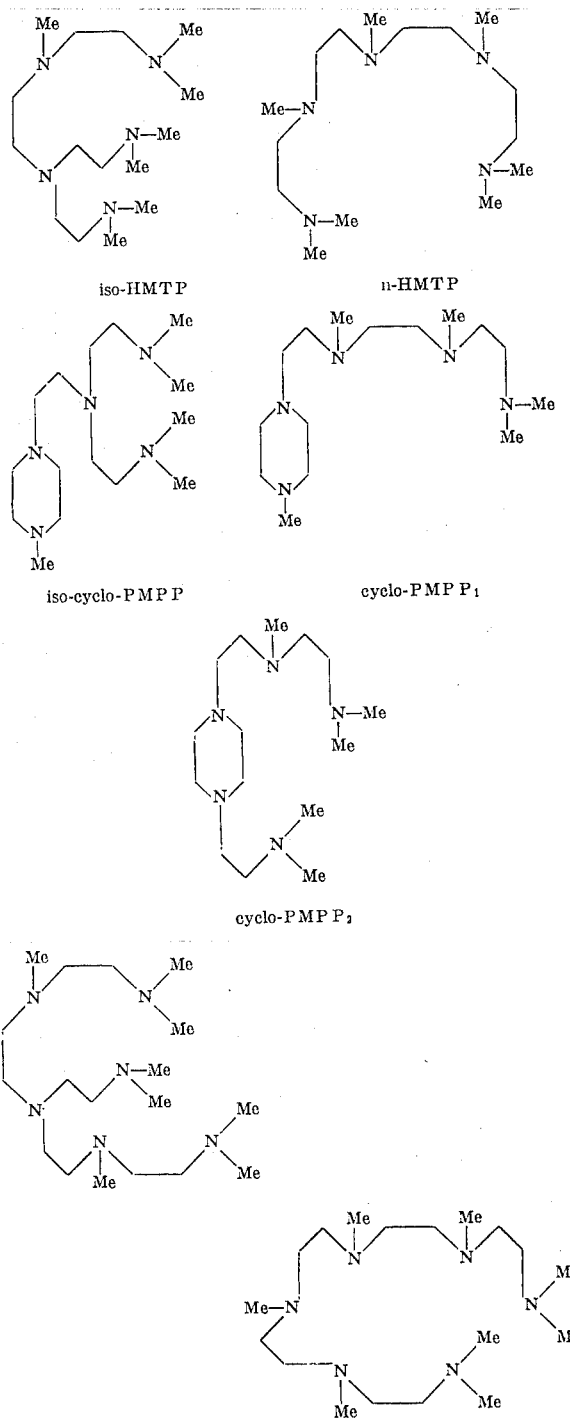

iso-HMTP n-HMTP iso-cyclo-PMPP cyclo-PMPP$_1$ cyclo-PMPP$_2$

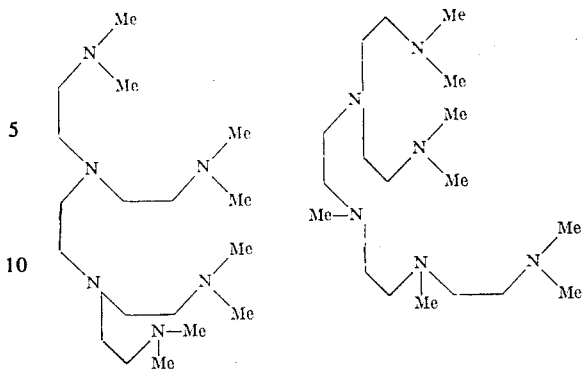

OMPH (Hexamine) Isomers

EXAMPLE 9 — Separation of iso-HMTT from iso-HMTP using NaI

A 3.7g sample of an amine mixture containing ≈65.4 percent of benzene by weight was combined with sodium iodide (0.15g) and 15 ml of heptane. This was stirred for 2 hours after which time the composition of the supernatant solution remained constant as determined by periodic gas chromatographic analysis. The mixture was filtered and the filtrate was evaporated. The residue obtained was distilled (bp. 87°–93°C/0.2 mmHg) to give 1 gram of purified product.

| | Wt.% | |
|---|---|---|
| Component | Original Sample | Purified Product |
| iso-HMTT | 10.9 | 2.4 |
| iso-HMTP | 84.3 | 92.2 |
| Other impurities* | 4.8 | 5.4 |

*Includes PMDT, cyclo-TriMTT, n-HMTT, sym-cyclo-TMTT, unsym-cyclo-TMTT, and n-HMTP.

This example shows that two branched chelating agents may be separated by means of this invention.

EXAMPLE 10

One gram of crude HMTT was combined with 59 mg of ZnCl$_2$ in 6 ml of THF. After stirring for 6 hours the solid which was deposited was isolated by filtration and was vacuum dried (yield 120mg, 82 percent). The amine composition of the chelate complex was obtained by G.C. analysis. The results are tabulated below:

| Component | Crude HMTT | Chelate | Corrected Composition |
|---|---|---|---|
| TMED, PDMT | 0.82 | | |
| iso-HMTT | 9.23 | 64.4 | 71.5 |
| n-HMTT | 80.90 | 33.3 | 25.9 |
| unsym-c-TMTT | 4.30 | 1.2 | 1.4 |
| sym-c-TMTT | 4.75 | 1.1 | 1.2 |

When the composition of the chelate is corrected for the 10 percent molar excess of ZnCl$_2$ used the values given under "Corrected Composition" are obtained.

This example illustrates that zinc salts preferentially complex the branched HMTT isomer.

EXAMPLE 11

To 2.3g (10 mmoles) of a mixture of iso-HMTT and HMTT (21.8:78.2) in 15 ml of n-pentane was added 0.325g (2.2 mmole) of sodium iodide with stirring. A fluffy precipitate formed almost immediately replacing the granular sodium iodide. The reaction was stirred overnight and filtered. G.C. analysis showed the composition of the filtrate to be (iso-HMTT:HMTT) 0.4:99.6 on a solvent-free basis.

This experiment shows that iso-HMTT can be selectively and simply removed from a mixture of iso-HMTT and HMTT by selective comlexation with sodium salts. The alternative method of separation involves a lengthy and careful fractional distillation which only partially separates the two chelating agents.

EXAMPLE 12

One gram of 80.9 percent n-HMTT was combined with $HgCl_2$ (3.5 mmol) in THF (6 ml) to give a clear solution. On standing overnight a crystalline complex deposited which was isolated by filtration. The complex was dissolved in hot THF and G.C. analysis of this solution showed it to contain 96.3 percent pure n-HMTT on a solvent-free basis.

Thus either the linear HMTT isomer (this example) or the branched HMTT isomer (Example 6) may be selectively complexed and isolated by the proper selection of the inorganic salt and reaction conditions.

What is claimed is:

1. A process for separating a mixture comprising tertiary N-peralkylated polyalkylene polyamines having from two to six nitrogen atoms which are each separated by two or three carbon atoms, said process comprising the steps of
    1. adding to said mixture an inorganic metal salt, said metal being one selected from the group consisting of sodium, potassium, magnesium, calcium, strontium, iron, zinc, cadmium and mercury wherein the lattice energy of the sodium salts is less than about 180 kilocals per mole, the lattice energy of potassium salt is less than 154 kilocals per mole, the lattice energy of the magnesium salt is less than 604 kilocals per mole, the lattice energy of the calcium salt is less than 546 kilocals per mole, the lattice energy of the strontium salt is less than 494 kilocals per mole, the lattice energy of the iron salt is less than 642 kilocals per mole, the lattice energy of the cadmium salt is less than 587 kilocals per mole, the lattice energy of the mercuric salt is less than 629 kilocals per mole, so as to form a solid complex of substantially only one tertiary polyalkylene polyamine which is that amine which forms the most stable complex, said addition step taking place either in the absence of a solvent or in the presence of a substantially anhydrous non-protic solvent;
    2. separating the solid complex resulting in step (1) and leaving behind an effluent;
    3. successively repeating steps (1) and (2) wherein the most stable metal-tertiary polyalkylene polyamine complexes are formed preferentially followed by the next most stable complexes until;
        a. the complex which results is that of the desired amine, or
        b. the effluent comprises substantially a single amine in pure form, and
        c. recovering the desired amine by destabilization of the complex from step (3) (a) or recovering the desired amine from the effluent of step (3)(b).

2. A process according to claim 1 wherein said metal is one selected from the group consisting of sodium, magnesium, iron, zinc, cadmium, and mercury wherein the lattice energy for the sodium salts is less than about 180 kilocals per mole and the lattice energy of the magnesium salts is less than 604 kilocals per mole, iron <642, Cd <587, Hg <629, Zn <629 Kcal/mole.

3. A process according to claim 1 wherein the anion of said metal salt is one selected from the group consisting of chloride, bromide, iodide, nitrate, hexafluorophosphate, hexafluoroborate, tetraphenylborate, perchlorate azide, hexafluoroarsenate, tetrafluoroberyllate, thiocyanate and nitrite.

4. A process according to claim 1 wherein said process is carried out in the presence of a solvent.

5. A process according to claim 1 wherein the said solvent is one selected from the group consisting of isopentane, heptane, benzene, toluene, tetralin, chlorobenzene, dichlorobenzene, thiophene and tetrahydrofuran.

6. A process according to claim 1 wherein the tertiary polyalkylene polyamines are selected from the group consisting of N-peralkylated cis- and trans-1,2- and 1,3-cyclohexanediamines.

7. A process according to claim 1 wherein the mixture of tertiary polyalkylene polyamines comprises N-permethylated triethylene tetramines.

* * * * *